US012393683B2

(12) United States Patent
Kim et al.

(10) Patent No.: US 12,393,683 B2
(45) Date of Patent: *Aug. 19, 2025

(54) METHOD FOR SUPPORTING DECISION-MAKING IN SECURITY CONTROL ENVIRONMENT BASED ON ARTIFICIAL INTELLIGENCE

(71) Applicant: Korea Internet & Security Agency, Naju-si (KR)

(72) Inventors: Do Won Kim, Naju-si (KR); Tae Eun Kim, Naju-si (KR); Ki Jong Son, Naju-si (KR); Sae Woom Lee, Naju-si (KR); Seul Ki Choi, Naju-si (KR); Tae Hyeon Kim, Naju-si (KR); Gyeong Jin Na, Naju-si (KR)

(73) Assignee: Korea Internet & Security Agency, Naju-si (KR)

( * ) Notice: Subject to any disclaimer, the term of this patent is extended or adjusted under 35 U.S.C. 154(b) by 129 days.

This patent is subject to a terminal disclaimer.

(21) Appl. No.: 18/385,387

(22) Filed: Oct. 31, 2023

(65) Prior Publication Data

US 2024/0152608 A1    May 9, 2024

(30) Foreign Application Priority Data

Nov. 9, 2022  (KR) .......................... 10-2022-0148493

(51) Int. Cl.
*G06F 21/55*    (2013.01)

(52) U.S. Cl.
CPC ...... *G06F 21/554* (2013.01); *G06F 2221/034* (2013.01)

(58) Field of Classification Search
CPC .................................................... G06F 21/554
See application file for complete search history.

(56) References Cited

U.S. PATENT DOCUMENTS 10,091,229 B2 *  10/2018  Stute ................... H04L 63/1433
12,124,573 B1 *  10/2024  Lim ....................... G06F 21/554
(Continued)

FOREIGN PATENT DOCUMENTS

| KR | 10-1416280 B1 | 7/2014 |
| KR | 10-2240514 B1 | 4/2021 |

(Continued)

OTHER PUBLICATIONS

Office Action of Korean Patent Application No. 10-2022-0148493 dated Aug. 15, 2024.

*Primary Examiner* — Oleg Korsak
(74) *Attorney, Agent, or Firm* — Revolution IP, PLLC

(57) ABSTRACT

A method of supporting decision-making of security control includes: (a) when an system for automatically analyzing a security threat receives a security warning from a security device, collecting security threat events generating the security warning from the security device; (b) when the collected security threat events exceed a preset event processing threshold, generating, by the system for automatically analyzing a security threat, a first request message for preferentially processing a security event; (c) when receiving the first request message generated from the system, determining, by the system for supporting priority of security control, a priority processing order of the security threat events, and notifying the system; and (d) when receiving the second request message generated from the system, determining, by the system for supporting priority of security control, a priority processing order and notifying the system for automatically analyzing a security threat of the determined priority processing order.

9 Claims, 4 Drawing Sheets

(56) References Cited

U.S. PATENT DOCUMENTS

2023/0156026 A1* 5/2023 Kim .................... H04L 63/1416
                                                      726/23
2023/0156043 A1* 5/2023 Kim .................... H04L 63/1441
                                                       726/1

FOREIGN PATENT DOCUMENTS

| KR | 10-2267101 B1 | 6/2021 |
| KR | 10-2419451 B1 | 7/2022 |
| KR | 10-2433831 B1 | 8/2022 |

* cited by examiner

METHOD FOR SUPPORTING DECISION-MAKING IN SECURITY CONTROL ENVIRONMENT BASED ON ARTIFICIAL INTELLIGENCE

BACKGROUND

1. Field of the Invention

The present invention relates to a method of supporting decision-making of security control, and more particularly, to a method of supporting decision-making of security control for selectively, quickly, and accurately processing high-importance events among a large number of security threat events.

2. Discussion of Related Art

Recently, cyber attacks have been increasing in frequency and sophistication, and threats that occurred in past operating systems, PC terminals, and the like are expanding to all devices (Internet of Things) connected to the Internet, and large-scale security events are being collected through various security solutions.

Typically, in a security control environment, it takes approximately 10 minutes or more on average for control personnel to analyze one security threat event, and an additional time is required depending on the importance of the security threat.

Due to this manual analysis by the control personnel, the workload of the control personnel is excessively increasing as repeated analysis and activities responding to the analysis increase, and since know-how, experience, and the like of each security controller are different, the time required for analysis and response is different, so it is difficult for the security controllers to carry out a consistent response.

In particular, there are many events that can be simply processed among a large number of security threat events, but since high-risk events may cause a fatal breach in operations and internal systems, there is an emerging need to select the high-risk events and preferentially process the high-risk events.

In addition, when various types of serious warnings occur while a playbook matching a security threat event is being executed, there is an emerging need to selectively and quickly select a playbook that needs to be preferentially processed and respond accordingly.

RELATED ART DOCUMENT

Patent Document (Patent Document 1): Korean Patent No. 10-1416280 (Registered Date: Jul. 1, 2014): Event Handling System and Method (Patent Document 2): Korean Patent No. 10-2267101 (Registered Date: Jun. 15, 2021): Security Control System for Responding Overseas Cyber Threat and Method Thereof

SUMMARY OF THE INVENTION

The present invention provides a method of supporting decision-making of security control for quickly and accurately processing a large number of security threat events, playbooks, and the like that require immediate response occurring in a security control environment by determining priorities of the security threat events, playbooks, and the like.

According to an exemplary embodiment, a method of supporting decision-making of security control for determining priority of security threat events using artificial intelligence in a security control environment includes: (a) when an system for automatically analyzing a security threat receives a security warning from a security device, collecting the security threat events generating the security warning from the security device; (b) when the collected security threat events exceed a preset event processing threshold, generating, by the system for automatically analyzing a security threat a first request message for preferentially processing a security event, when the collected security threat events do not exceed the event processing threshold, determining whether execution of a playbook is required as an alarm occurs and stops while the playbook is being executed, when it is determined that the execution of the playbook is required, generating a second request message for preferentially processing the playbook, when it is determined that the execution of the playbook is not required, determining whether an optimal policy recommendation is required, and when the optimal policy recommendation is required, generating a third request message for receiving the optimal policy recommendation; (c) when receiving the first request message generated from the system for automatically analyzing a security threat, determining, by the system for supporting priority of security control, a priority processing order of the security threat events to be preferentially processed in a current situation through an artificial intelligence learning model in consideration of an event risk, a playbook execution time, and a risk occurrence frequency, and notifying the system for automatically analyzing a security threat of the determined priority processing order of the security threat event; and (d) when receiving the second request message generated from the system for automatically analyzing a security threat, determining, by the system for supporting priority of security control, a priority processing order of the playbook in consideration of the event risk, a remaining playbook execution time, and the event risk and notifying the system for automatically analyzing a security threat of the determined priority processing order of the playbook.

The (c) may include: (c-1) applying a supervised learning-based priority processing model to a list of the security threat events included in the first request message and determining whether an attack type is present; (c-2) when the attack type is present as a result of the determination, confirming a predefined risk table and sorting the security threat events in the list of security threat events in descending order of the event risk; and (c-3) when no attack type is present as a result of the determination, adding a security event type and inputting the event risk to confirm the risk table.

The (c) may further include: (c-4) sorting the list of security threat events in descending order of playbook execution time after the (c-2); (c-5) sorting the security threat events in the list of security threat events in ascending order of security threat occurrence frequency after the (c-4); and (c-6) determining whether the sorting is completed and classified as in the (c-2), (c-4), and (c-5).

The (c) may further include (c-7) applying a reinforcement learning-based priority processing model to the list of security threat events included in the first request message to store the priority processing event, and then checking whether the stored priority processing event is classified.

The (c) may further include (c-8) notifying the system for automatically analyzing a security threat of the event priority processing order reflecting the completed result, when it is determined that the sorting is completed as in the (c-6) and (c-7).

The (c) may further include (c-9) performing (c-1) when it is determined that the classification is not completed as in the (c-6) and (c-7).

The (d) may include: (d-1) when receiving the second request message, sorting the security threat events in ascending order of event risk in the list of security threat events included in the second request message while the playbook needs to be re-executed and a queue value is one or less; and (d-2) when the same security threat risk is present by determining whether a predefined identical security threat risk is present, sorting the security threat events in the list of security threat events in the order of shortest remaining playbook execution time.

The (d) may further include (d-3) classifying the results sorted in the (d-1) or (d-2) to determine the priority processing order of the playbook to be re-executed and notifying the system for automatically analyzing a security threat of the determined priority processing order, after the operation (d-2) or when no identical security threat risk is present and the queue value is one or more.

The method may further include (e) when the system for supporting priority of security control receives the third request message, applying a reinforcement learning-based optimal response policy model to determine optimal response policy priority to be promoted as an optimal priority policy in a current situation and notifying the system for automatically analyzing a security threat of the determined optimal response policy priority.

DETAILED DESCRIPTION OF EXEMPLARY EMBODIMENTS

Terms used in the specification are used to describe embodiments, and are not intended to restrict and/or limit the disclosed invention. For example, in the present specification, singular forms may include plural forms unless the context clearly indicates otherwise. In particular, in the following, each system and security threat event as data is expressed in the singular, but should be understood to mean a plural number in practice.

In addition, terms such as "include" and the like are intended to express the presence of features, numbers, steps, operations, components, parts, or combinations thereof described in the specification, and the possibility of additional presence or addition of one or more other features, numbers, steps, operations, components, parts or combinations thereof is not excluded.

In addition, terms including an ordinal number, such as "first" or the like, are used to distinguish one component from other components and do not refer to the one component.

In addition, the term "unit" or "module" may refer to a unit that processes at least one function or operation. For example, the term "unit" may refer to at least one piece of hardware such as field-programmable gate array (FPGA)/application specific integrated circuit (ASIC), at least one piece of software stored in a memory, or at least one process processed by a processor.

Hereinafter, embodiments of the disclosed invention will be described in detail with reference to each of the accompanying drawings.

Figure 1:
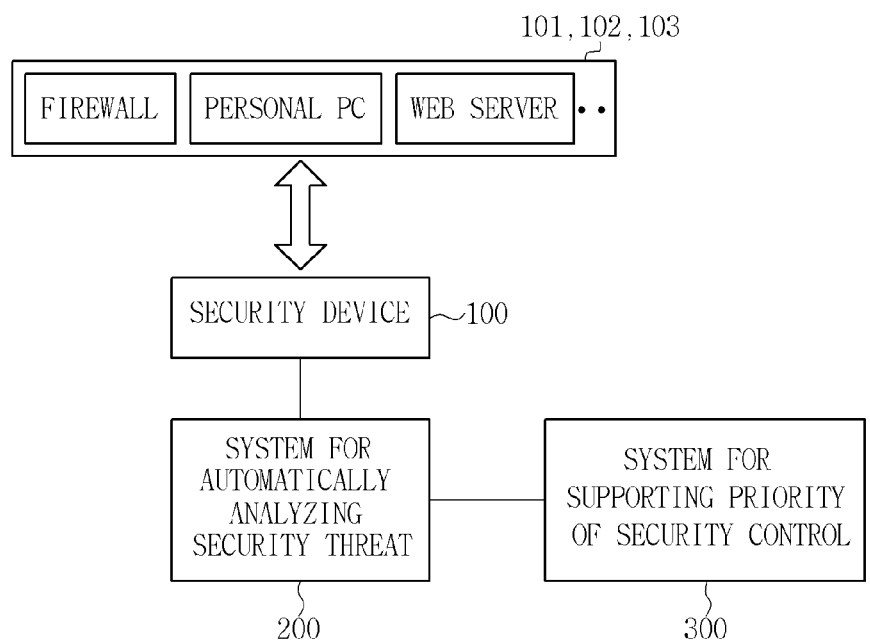
FIG. 1 is a configuration diagram schematically illustrating a system for supporting decision-making of security control in a security control environment according to an embodiment of the present invention.
Figure 2:
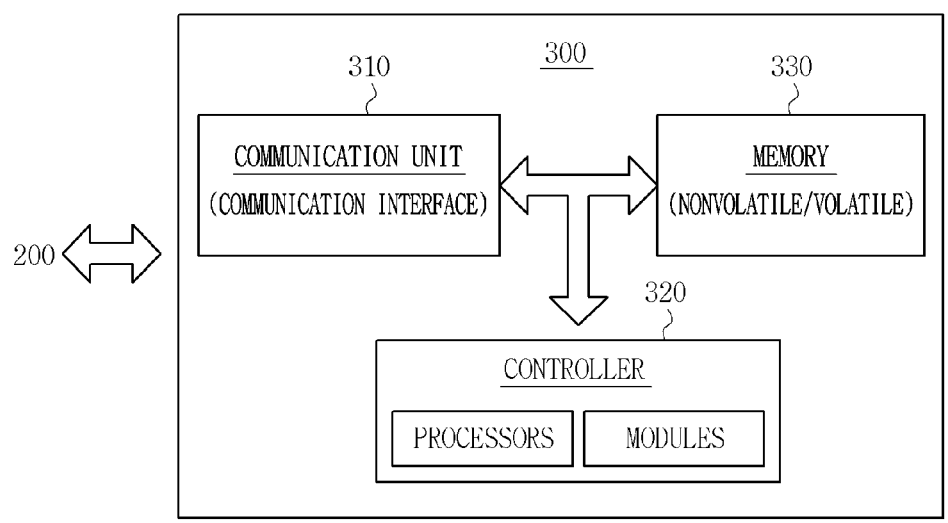
FIG. 2 is a configuration diagram illustrating an example of a specific configuration of a system for supporting priority of security control of FIG. 1 according to an embodiment of the present invention.

FIG. 1 is a configuration diagram schematically illustrating a system for supporting decision-making of security control in a security control environment according to an embodiment of the present invention, and FIG. 2 is a configuration diagram illustrating an example of a specific configuration of a system for supporting priority of security control of FIG. 1 according to an embodiment of the present invention.

As illustrated, the system for supporting decision-making of security control according to the embodiment of the present invention may include at least one security device 100 connected to a firewall 101, a personal PC 102, a web server 103, and the like through a network, a system 200 for automatically analyzing a security threat connected to the security device 100 through an in-house network, and a system 300 for supporting priority of security control connected to the system 200 for automatically analyzing a security threat through the in-house network.

The above-described network refers to a connection structure that allows information exchange between each node connected between the firewall 101, the personal PC 102, the web server 103, etc., and the security device 100. Examples of such networks may include a local area network (LAN) and a wired data communication network in a narrow sense, and a wide area network (WAN), an Internet network (World Wide Web (WWW)), a wireless broadband (WiBro) network, and a mobile communication network in a broad sense, but are not necessarily limited thereto. On the other hand, the in-house network may be the above-described network in a narrow sense, or may simply be a wired communication network.

In an embodiment, at least one security device 100 may detect security threat events collected from the firewall 101, the personal PC 102, the web server 103, etc., in real time.

The at least one security device 100 may include enterprise security management (ESM), security information & event management (SIEM), an intrusion detection system (IDS), and a machine learning solution, but is not necessarily limited thereto.

Here, the ESM is an integrated security management system that gathers logs and events from security solutions such as firewall, IPS (IDS), and UTM, and may perform functions such as integrated management of integrated solutions and interconnection between solutions, the SIEM is a system in which security information management (SIM) and security event management (SEM) are combined and has an evolved form of enterprise security management (ESM), and may refer to an integrated security control solution that collects logs and events occurring in a wide range such as various types of server equipment, network equipment, and application programs installed on a computer, and blocks threats in advance through big data-based correlation analysis.

In an embodiment, the system 200 for automatically analyzing a security threat is a system for automatically analyzing and processing security threats in a security control environment, and may collect a large number of security threat events from the security device 100 and then may perform security response according to predefined rules.

The system 200 for automatically analyzing a security threat uses a playbook to respond to security threat events, and prepares a response process in advance in the form of a playbook for each attack type and situation type, and when a security threat event corresponding to a specific attack type or situation type occurs, the system 200 for automatically analyzing a security threat may respond by selecting a specific playbook corresponding to the security threat event.

However, when the playbook execution is stopped in the middle due to serious security warnings identified by predefined rules or/and serious warnings occur during the playbook execution, control personnel should manually analyze the security threat event. In this case, it is time consuming and it is difficult to respond immediately to serious security warning.

Therefore, when it is difficult to quickly and accurately analyze a large number of security threat events generated by an attacker in order to detect the attacker who generate the security threats by collecting the security threat events detected by the at least one security device 100 described above, the system 200 for automatically analyzing a security threat may request help from the system 300 for supporting priority of security control by inquiring about a priority processing order of security threat events and a priority processing order of playbooks to the system 300 for supporting priority of security control, which will be explained later.

For example, the system 200 for automatically analyzing a security threat may perform a function of requesting decision-making on priority of security threats events to be preferentially processed from the system 300 for supporting priority of security control, which will be explained below, when it is difficult to perform automatic analysis due to numerous emergency security warnings, perform a function of requesting the system 300 for supporting priority of security control to determine priority of playbooks to be preferentially processed, and perform a function of requesting those who need an optimal response policy from the system 300 for supporting priority of security control.

In an embodiment, in a case in which a large number of security events occur and various types of priority decisions are requested to classify important events from the system 200 for automatically analyzing a security threat, the system 300 for supporting priority of security control may include a communication unit 310, a controller 320, a memory 330, and the like to perform decision-making of priority of each event.

The communication unit 310 may be connected to the system 200 for automatically analyzing a security threat through an in-house network or/and a wired communication network in a narrow sense, etc., to provide a communication interface to exchange data related to security threat events and security threat priority processing requests and priority selection decisions from the system 200 for automatically analyzing a security threat.

In an embodiment, the controller 320 may perform a function of determining (selecting) priority of security threat events in order to preferentially process at least one security threat event in response to the request of the system 200 for automatically analyzing a security threat by considering a event risk, a playbook execution time matching at least one security threat event, and a security threat occurrence frequency through an artificial intelligence model or its own software algorithm, and transmit the processed results to the system 200 for automatically analyzing a security threat.

In addition, when a warning or the like occurs during the execution of the playbook matching the security threat event requested from the system 200 for automatically analyzing a security threat and the execution of the playbook stops, the controller 320 may a function of determining (selecting) priority of playbooks to be preferentially processed in response to a request that occurs in situations such as when a playbook that needs to be re-executed occurs by considering the event risk, the remaining playbook execution time, and the security threat occurrence frequency through the artificial intelligence model or its own software algorithm, and transmit the processed results to the system 200 for automatically analyzing a security threat.

In addition, the controller 320 may perform a function of determining the priority of the optimal response policy to be promoted as the optimal priority policy in the current situation by receiving the security threat events provided from the system 200 for automatically analyzing a security threat and applying a reinforcement learning-based optimal response policy model (artificial intelligence model), and transmit the results to the system 200 for automatically analyzing a security threat.

This controller 320 may substantially process software processes (algorithms) and may be composed of at least one processor and/or processing module, etc.

The above-described at least one processor may execute, for example, software to control at least one other component (e.g., components of the communication unit, etc.) and may perform various data processes or calculations.

Such at least one processor may, as at least part of data processing or calculation, store instructions or data received from other components (e.g., communication unit) in the memory 330, process instructions or data stored in the memory 330, such as a non-volatile memory, and may store the processed result data in a non-volatile memory, for example.

In addition, at least one processor may include a hardware configuration specialized for processing the artificial intelligence model as described above. The artificial intelligence model disclosed may be generated through machine learning, and the machine learning may be performed, for example, in the system 300 for supporting priority of security control itself which the artificial intelligence performs, or may be performed through a separate artificial intelligence system. Examples of the artificial intelligence learning algorithm include supervised learning, unsupervised learning, semi-supervised learning, or reinforcement learning, but are not limited to the above examples.

Such an artificial intelligence model may include multiple artificial neural network layers, and the artificial neural network disclosed may be a deep-neural network (DNN), a convolutional neural network (CNN), a recurrent neural network (RNN), a restricted boltzmann network (RBM), a deep belief network (DBN), a bidirectional recurrent deep neural network (BRDNN), deep Q-networks, or a combination of two or more of the above networks, but is not limited to the above examples. In addition to hardware structures, the artificial intelligence model may include additional or alternative software structures.

In an embodiment, the memory 330 may store various types of data used by at least one component (e.g., controller 320; at least one processor) of the system 300 for supporting priority of security control. The above-described data in various forms may include, for example, processing data of a decision-making program for selecting priority and input data or output data for commands related thereto.

The memory 330 may include a volatile memory and/or non-volatile memory.

As such, in this embodiment, the system 200 for automatically analyzing a security threat may quickly support security response tasks decision-made according to priority of various types of events that require faster security response in response to a large number of security threat events, and therefore, will be able to block security threats from hackers and attackers in advance.

Meanwhile, similar to the configuration of the communication unit 310, the controller 320, and the memory 330 of the system 300 for supporting priority of security control, it is obvious that the system 200 for automatically analyzing a security threat may include a communication interface that may exchange data between the at least one security device 100 and the system 300 for supporting priority of security control, a controller that processes each function, and a memory.

Hereinafter, the method of supporting decision-making of security control realized by the system 200 for automatically analyzing a security threat and system 300 for supporting priority of security control will be described in detail.

The system 200 for automatically analyzing a security threat and the system 300 for supporting priority of security control, which will be handled below, are substantially processed by components such as the controller and communication unit, but a method of preferentially processing a security task in a security control environment to be dealt with below may be processed without being limited to each hardware configuration of the system 200 for automatically analyzing a security threat and the system 300 for supporting priority of security control, and therefore, for convenience, is assumed to be handled by system 200 for automatically analyzing a security threat and the system 300 for supporting priority of security control.

Figure 3:
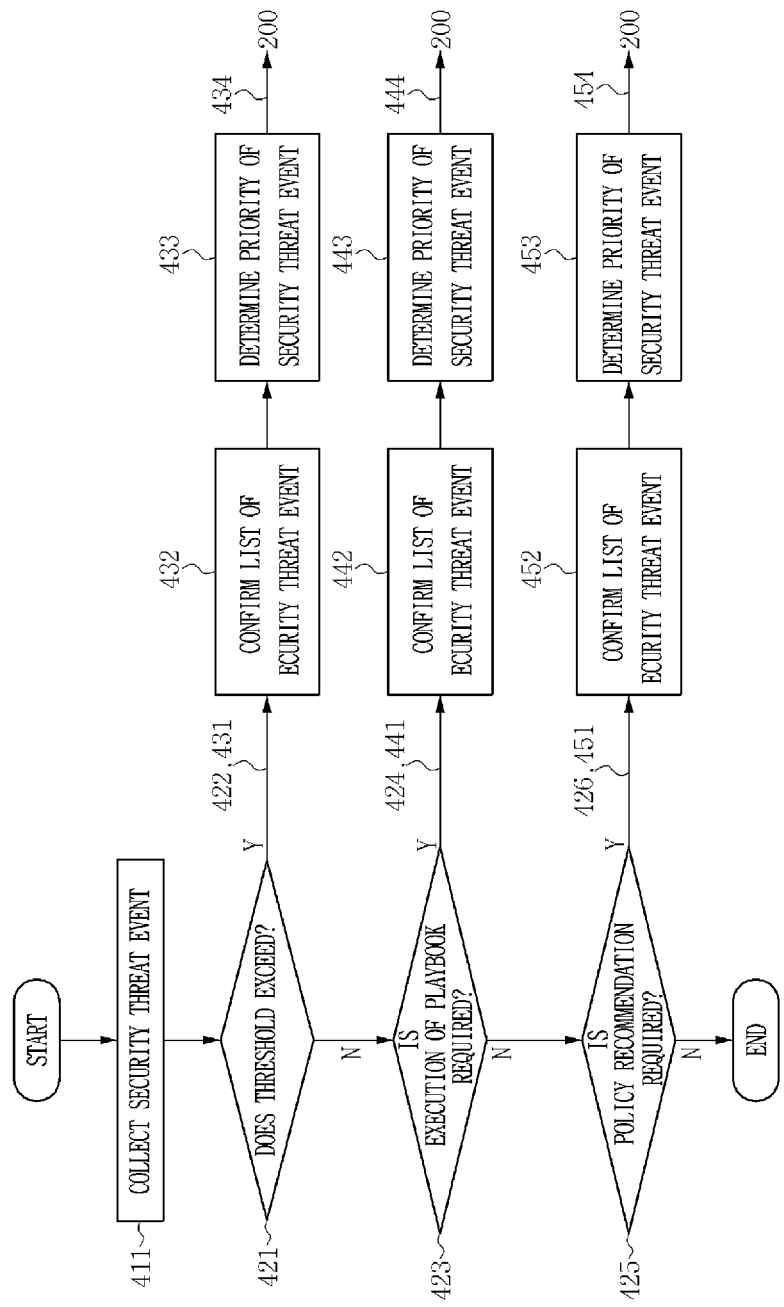
FIG. 3 is a flowchart schematically illustrating a method of preferentially processing a security task in a security control environment according to an embodiment of the present invention.

FIG. 3 is a flowchart schematically illustrating a method of preferentially processing a security task in a security control environment according to an embodiment of the present invention.

Referring to FIG. 3, the method of preferentially processing a security task according to the embodiment of the present invention may include operations 410 and 420 performed by the system 200 for automatically analyzing a security threat and operations 430, 440, and 450 performed by the system 300 for supporting priority of security control.

In operation 410, when receiving a security warning from the security device 100, the system 200 for automatically analyzing a security threat according to the embodiment may collect the security threat events that generate the security warning from the security device (411).

In operation 420, when it is determined that the collected security threat events exceeds the preset event processing threshold (421), the system 200 for automatically analyzing a security threat may generate a first request message for preferentially processing the security event (422), and when the collected security threat events do not exceed the event processing threshold (421), whether the execution of the playbook is necessary because it stops due to a warning occurring while the playbook is being executed is determined (423).

For example, when it is determined that the execution of the playbook is necessary (423), the system 200 for automatically analyzing a security threat may generate a second request message for preferentially processing the playbook (424), and when it is determined that the execution of the playbook is unnecessary (423), the system 200 for automatically analyzing a security threat may determine whether optimal policy recommendation is necessary (425).

For example, when the optimal policy recommendation is necessary, the system 200 for automatically analyzing a security threat may generate a third request message for receiving the optimal policy recommendation (426). However, when the optimal policy recommendation is unnecessary, it may be terminated.

The above-described first to third request messages contain each unique request intention as described above and include a list of security threat events that collects security threat events in common, and the above-described event processing threshold may refer to a set value or a reference value of reference data that requires immediate security threat event processing.

In operation 430, when receiving the first request message generated from the system 200 for automatically analyzing a security threat (431), the system 300 for supporting priority of security control may confirm the list of security threat events included in the received first request message (432), determine priority of security threat events to be preferentially processed in a current situation through, for example, supervised learning or/and reinforcement learning artificial intelligence learning models by considering an event risk, a playbook execution time, and a risk occurrence frequency based on the confirmed list of the security threat events (433), and notify the system 200 for automatically analyzing a security threat of the result (434).

In operation 440, when receiving the second request message generated from the system 200 for automatically analyzing a security threat (441), the system 300 for supporting priority of security control may confirm the list of security threat events included in the received second request message (442), determine priority of security threat events to be preferentially processed in a current situation through, for example, supervised learning or/and reinforcement learning artificial intelligence learning models by considering the event risk, the remaining playbook execution time, and the risk occurrence frequency based on the confirmed list of the security threat events (443), and notify the system 200 for automatically analyzing a security threat of the determined result (444).

In operation 450, when receiving the third request message (451), the system 300 for supporting priority of security control according to the embodiment may confirm the list of security threat events included in the received third request message (452), apply a reinforcement learning-based optimal response policy model based on the confirmed list of the security threat events to determine the optimal response policy priority to be promoted as the optimal priority policy in the current situation (453), and notify the system 200 for automatically analyzing a security threat of the determined result (454).

Figure 4:
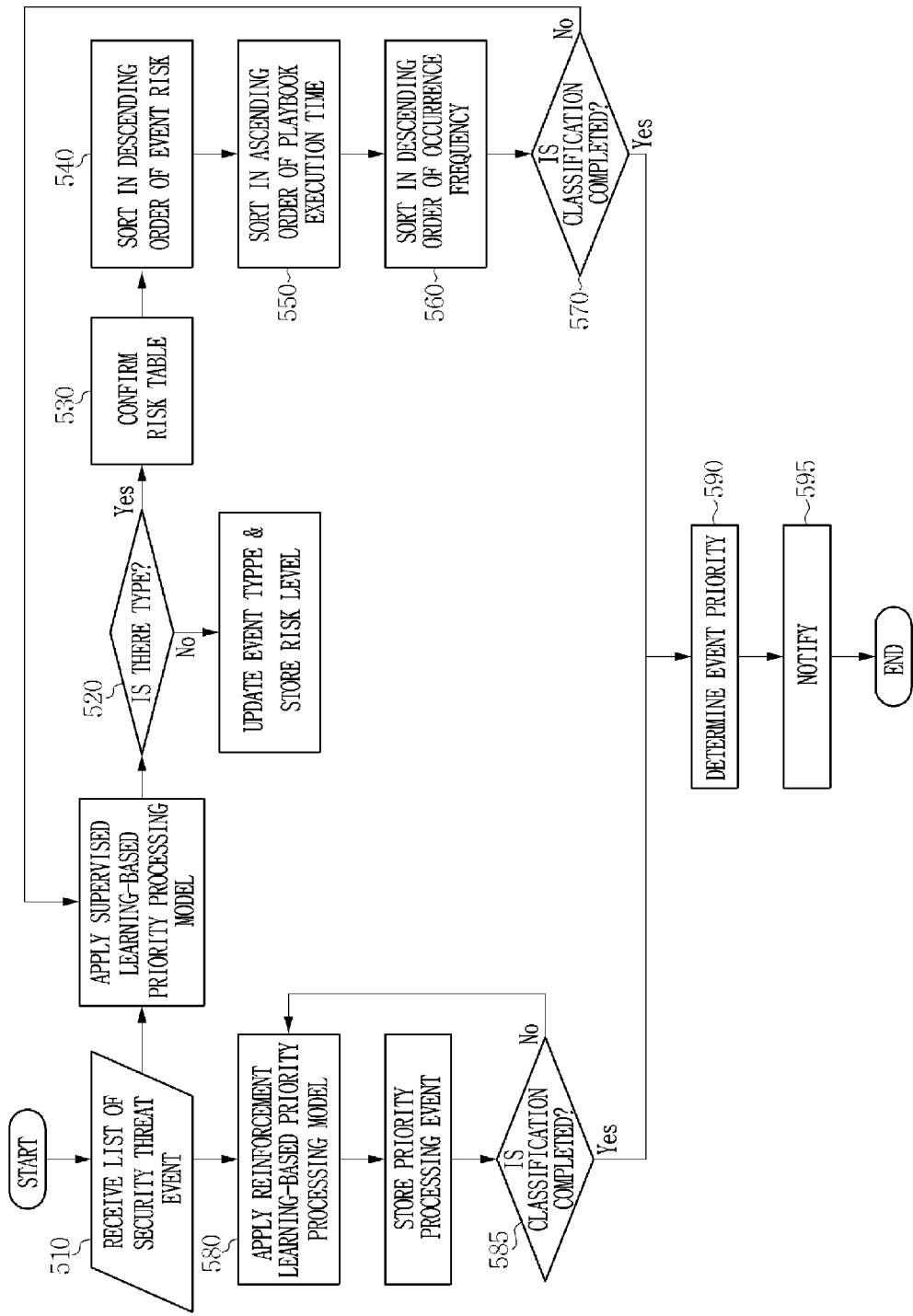
FIG. 4 is a flowchart illustrating a specific example of operation 430 of determining priority of security events according to an embodiment of the present invention.

FIG. 4 is a flowchart illustrating a specific example of operation 430 of determining priority of security events according to an embodiment of the present invention.

Referring to FIG. 4, the system 300 for supporting priority of security control according to the embodiment may perform operations 431 to 439 to determine a security event priority processing order.

First, in operation 431, the system 300 for supporting priority of security control may receive the list of security threat events included in the first request message from system 200 for automatically analyzing a security threat (510), and apply the received list of security threat events to a supervised learning-based artificial intelligence (priority processing) model to determine what type of attack the attacker is carrying out through learning using the supervised learning algorithm (520).

In operation 432, when the system 300 for supporting priority of security control determines what type of attack it is as a result of determining the above-described attack type, the system 300 for supporting priority of security control may confirm a predefined risk table (530) to sort security threat events in descending order of event risk in the list of security threat events (540). That is, each security threat event in the list of security threat events may be sorted according to priority so that the events are processed in descending order of risk.

In operation 433, when the system 300 for supporting priority of security control may not determine what type of attack it is as a result of the determination of the attack type in operation 432, the system 300 for supporting priority of security control may add the security event type and may re-input the event risk, and then may re-confirm the risk table based on this (530).

In operation 434, the system 300 for supporting priority of security control may sort the security risk events so that they are processed in descending order of playbook execution time matching the corresponding security threat event in the list of security threat events included in the first request message after the processing in operation 432 (550).

In operation 435, the system 300 for supporting priority of security control may sort security threat events so that they are processed in ascending order of security risk occurrence frequency in the list of security threat lists after the processing in operation 434 (560).

In operation 436, the system 300 for supporting priority of security control may determine whether the sorting has been completed and classified as in operations 432 to 435 (570).

In operation 437, unlike the above-described supervised learning artificial intelligence model, the system 300 for supporting priority of security control may apply the reinforcement learning artificial intelligence model (priority processing model), and apply, for example, the list of security threat events included in the first request message to the reinforcement learning-based priority processing model and learns the list of security threat events through a priority processing algorithm (580) and then store the priority processing events in the memory 330 as a result of the learning, and determine whether the priority processing events have been classified, including the priority of a large number of stored security threat events (585).

In operation 438, when the system 300 for supporting priority of security control determines that the classification has been completed as in operations 436 and/or 437 (570 and 585), and may determine the event priority reflecting the completed results (590) and notify the system 200 for automatically analyzing a security threat of the determined event priority (595).

In operation 439, when the system 300 for supporting priority of security control determines that the classification has not been completed as in operation 436 or/and 437 (570 and 585), the system 300 for supporting priority of security control may re-perform operation 431 or/and 580. In this case, the subsequent process has been described above, and therefore, descriptions thereof will be omitted.

Accordingly, when the system 200 for automatically analyzing a security threat is notified of the decision-making result that determines the event priority from the system 300 for supporting priority of security control, the system 200 for automatically analyzing a security threat will be able to quickly defend against attackers' hacking attacks by quickly processing the security threat events according to the event priority processing order.

Figure 5:
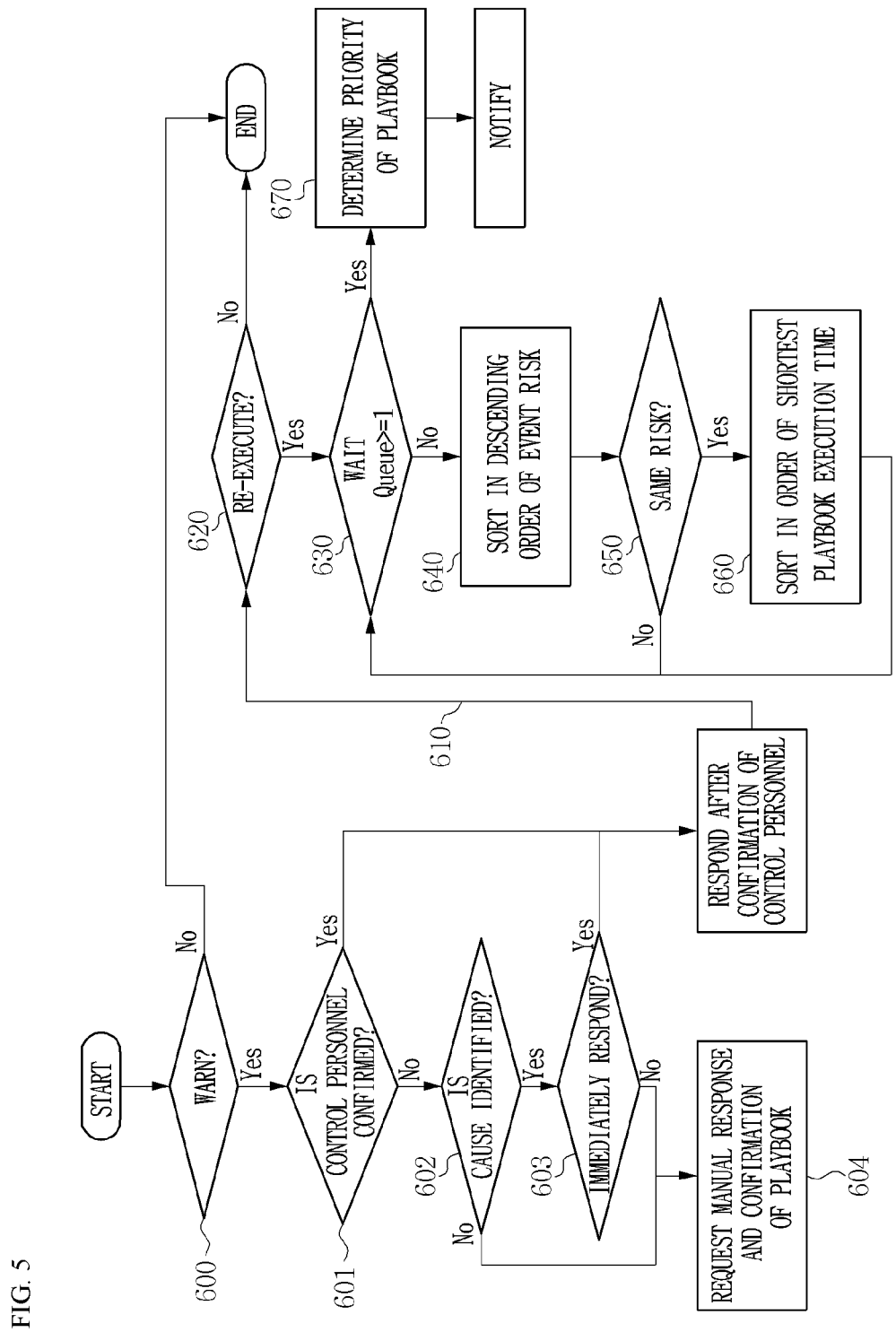
FIG. 5 is a flowchart illustrating a specific example of operation 440 of determining priority of playbooks according to an embodiment of the present invention.

FIG. 5 is a flowchart illustrating a specific example of operation 440 of determining priority of playbooks according to an embodiment of the present invention.

Referring to FIG. 5, the system 300 for supporting priority of security control according to the embodiment may perform operations 441 to 443 to determine the playbook priority.

Prior to describing operations 441 to 443, when the system 200 for automatically analyzing a security threat generates a warning alarm when executing the playbook matching the security threat event and stops (600), control personnel will confirm this situation. When the control personnel confirms this situation (601), the system 200 for automatically analyzing a security threat may generate the second request message described above (610), and when the control personnel does not immediately confirm this situation (601) and determines that the quick security response is necessary (603) as a result of identifying the cause of the warning for a certain period of time (602), the system 200 for automatically analyzing a security threat may generate the second request message described above (610).

However, when the control personnel determine that a quick security response is unnecessary (603) as a result of identifying the cause of the warning (602), the manual response (604) or the operation 403 may be repeatedly performed.

In this case, in operation 441 according to an embodiment, the system 300 for supporting priority of security control may receive the second request message from the system 200 for automatically analyzing a security threat (610), and determine whether the re-execution of the playbook is necessary (620).

In other words, when it is determined that the re-execution of the playbook is necessary (620), the system 300 for supporting priority of security control may determine whether a queue value is 1 or more (630), and when it is determined that the queue value is not 1 or more, the system 300 for supporting priority of security control may sort the security threat events in the list of security threat events included in the second request message so that they are processed in descending order of event risk (640).

In operation 442, the system 300 for supporting priority of security control may determine whether the predefined identical security threat risk is present after operation 441 (650).

That is, when it is determined that the same security threat risk is present after operation 441, the system 300 for supporting priority of security control may sort the security threat events in the list of security threat events collecting the security threat events included in the second request message so that they are processed in order of shortest remaining playbook execution time (660).

In operation 443, when it is determined that no risk of the same security threat is present after operation 442 or in operation 442 (650) and the queue value is 1 or more (630), the system 300 for supporting priority of security control may determine the playbook priority that requires re-executing the playbook by classifying (selecting) the results sorted in operations 441 or 442 (670).

In this way, the system 300 for supporting priority of security control will be able to notify the system 200 for automatically analyzing a security threat of the determined playbook priority to be re-executed including the classified results (680).

Therefore, the system 200 for automatically analyzing a security threat according to the embodiment will be able to quickly respond to security threats by quickly re-executing the playbook according to the priority of the playbook matching the order of the corresponding security threat events according to the priority of the playbook priority to be re-executed as notified from the system 300 for supporting priority of security control.

The above-described embodiment according to the present invention may be implemented in a form of program commands that may be executed through various components and may be recorded on a computer-readable recording medium. The computer-readable recording medium may include a program command, a data file, a data structure, or the like, alone or a combination thereof. The program commands recorded in the computer-readable recording medium may be especially designed and constituted for the present invention or be known to those skilled in a field of computer software. Examples of the computer-readable recording medium may include a magnetic medium such as a hard disk, a floppy disk, or a magnetic tape, an optical recording medium such as a compact disk read only memory (CD-ROM) or a digital versatile disk (DVD), a magneto-optical medium such as a floptical disk, and a hardware device specially configured to store and execute program commands, such as a read only memory (ROM), a random access memory (RAM), a flash memory, or the like. Examples of the program commands include a high-level language code capable of being executed by a computer using an interpreter, or the like, as well as a machine language code made by a compiler. The above-described hardware device may be constituted to be operated as one or more software modules to perform processing according to the present disclosure, and vice versa.

As described above, according to an embodiment of the present invention, even when a large number of serious security threat events occur, by prioritizing security threat events and quickly processing the security threat events, it is possible to quickly respond to security attacks.

In addition, according to an embodiment of the present invention, even when a serious security warning that a playbook stops occurs, by prioritizing and quickly processing playbooks matching a large number of security threat events, it is possible to quickly respond to security attacks by normalizing the playbook.

In addition, according to an embodiment of the present invention, even when a large number of serious security threat events occur, it is possible to systematically respond quickly to security attacks by selecting an optimal response policy.

The present invention is not limited to the above-described effects, and other effects that are not described may be clearly understood by those skilled in the art from the description below.

Meanwhile, although the present invention has been described by embodiments and drawings limited to specific details such as specific components according to the above-described embodiment of the present invention, they have been provided only for assisting in the entire understanding of the present invention. Therefore, the present invention is not limited to the exemplary embodiments. Various modifications and changes may be made by those skilled in the art to which the present invention pertains from this description.

Therefore, the idea described in the present invention should not be limited to the above-described embodiments. In addition, not only the scope of the patent claims described below, but also all modifications equal to or equivalent to the scope of this patent claim fall within the scope of the spirit of the present invention.

What is claimed is:

1. A method of supporting decision-making of security control for determining priority of security threat events using artificial intelligence in a security control environment, the method comprising:
    (a) when a system for automatically analyzing a security threat receives a security warning from a security device, collecting the security threat events generating the security warning from the security device;
    (b) when the collected security threat events exceed a preset event processing threshold, generating, by the system for automatically analyzing a security threat, a first request message for preferentially processing a security event, when the collected security threat events do not exceed the event processing threshold, determining whether execution of a playbook is required as an alarm occurs and stops while the playbook is being executed, when it is determined that the execution of the playbook is required, generating a second request message for preferentially processing the playbook, when it is determined that the execution of the playbook is not required, determining whether an optimal policy recommendation is required, and when the optimal policy recommendation is required, generating a third request message for receiving the optimal policy recommendation;
    (c) when receiving the first request message generated from the system for automatically analyzing a security threat, determining, by the system for supporting priority of security control, a priority processing order of the security threat events to be preferentially processed in a current situation through an artificial intelligence learning model in consideration of an event risk, a playbook execution time, and a risk occurrence frequency, and notifying the system for automatically analyzing a security threat of the determined priority processing order of the security threat event; and
    (d) when receiving the second request message generated from the system for automatically analyzing a security threat, determining, by the system for supporting priority of security control, a priority processing order of the playbook in consideration of the event risk, a remaining playbook execution time, and the event risk and notifying the system for automatically analyzing a security threat of the determined priority processing order of the playbook.

2. The method of claim 1, wherein the (c) includes:
    (c-1) applying a supervised learning-based priority processing model to a list of the security threat events included in the first request message and determining whether an attack type is present;
    (c-2) when the attack type is present as a result of the determination, confirming a predefined risk table and sorting the security threat events in the list of security threat events in descending order of the event risk; and (c-3) when no attack type is present as a result of the determination, adding a security event type and inputting the event risk to confirm the risk table.

3. The method of claim 2, wherein the (c) further includes:
(c-4) sorting the list of security threat events in descending order of playbook execution time after the (c-2);
(c-5) sorting the security threat events in the list of security threat events in ascending order of security threat occurrence frequency after the (c-4); and
(c-6) determining whether the sorting is completed and classified as in the (c-2), (c-4), and (c-5).

4. The method of claim 3, wherein the (c) further includes (c-7) applying a reinforcement learning-based priority processing model to the list of security threat events included in the first request message to store the priority processing event, and then checking whether the stored priority processing event is classified.

5. The method of claim 4, wherein the (c) further includes (c-8) notifying the system for automatically analyzing a security threat of the event priority processing order reflecting the completed result, when it is determined that the sorting is completed as in the (c-6) and (c-7).

6. The method of claim 5, wherein the (c) further includes (c-9) performing (c-1) when it is determined that classification is not completed as in the (c-6) and (c-7).

7. The method of claim 1, wherein the (d) includes:
(d-1) when receiving the second request message, sorting the security threat events in ascending order of event risk in the list of security threat events included in the second request message while the playbook needs to be re-executed and a queue value is one or less; and
(d-2) when the same security threat risk is present by determining whether a predefined identical security threat risk is present, sorting the security threat events in the list of security threat events in the order of shortest remaining playbook execution time.

8. The method of claim 7, wherein the (d) further includes (d-3) classifying the results sorted in the (d-1) or (d-2) to determine the priority processing order of the playbook to be re-executed and notifying the system for automatically analyzing a security threat of the determined priority processing order, after the operation (d-2) or when no identical security threat risk is present and the queue value is one or more.

9. The method of claim 1, further comprising, (e) when the system for supporting priority of security control receives the third request message, applying a reinforcement learning-based optimal response policy model to determine optimal response policy priority to be promoted as an optimal priority policy in a current situation and notifying the system for automatically analyzing a security threat of the determined optimal response policy priority.

* * * * *